R. H. WILHELM.
VALVE FOR PERCUSSIVE TOOLS.
APPLICATION FILED OCT. 20, 1915.

1,248,966.

Patented Dec. 4, 1917.
2 SHEETS—SHEET 1.

INVENTOR
Russell H. Wilhelm
BY
ATTORNEY

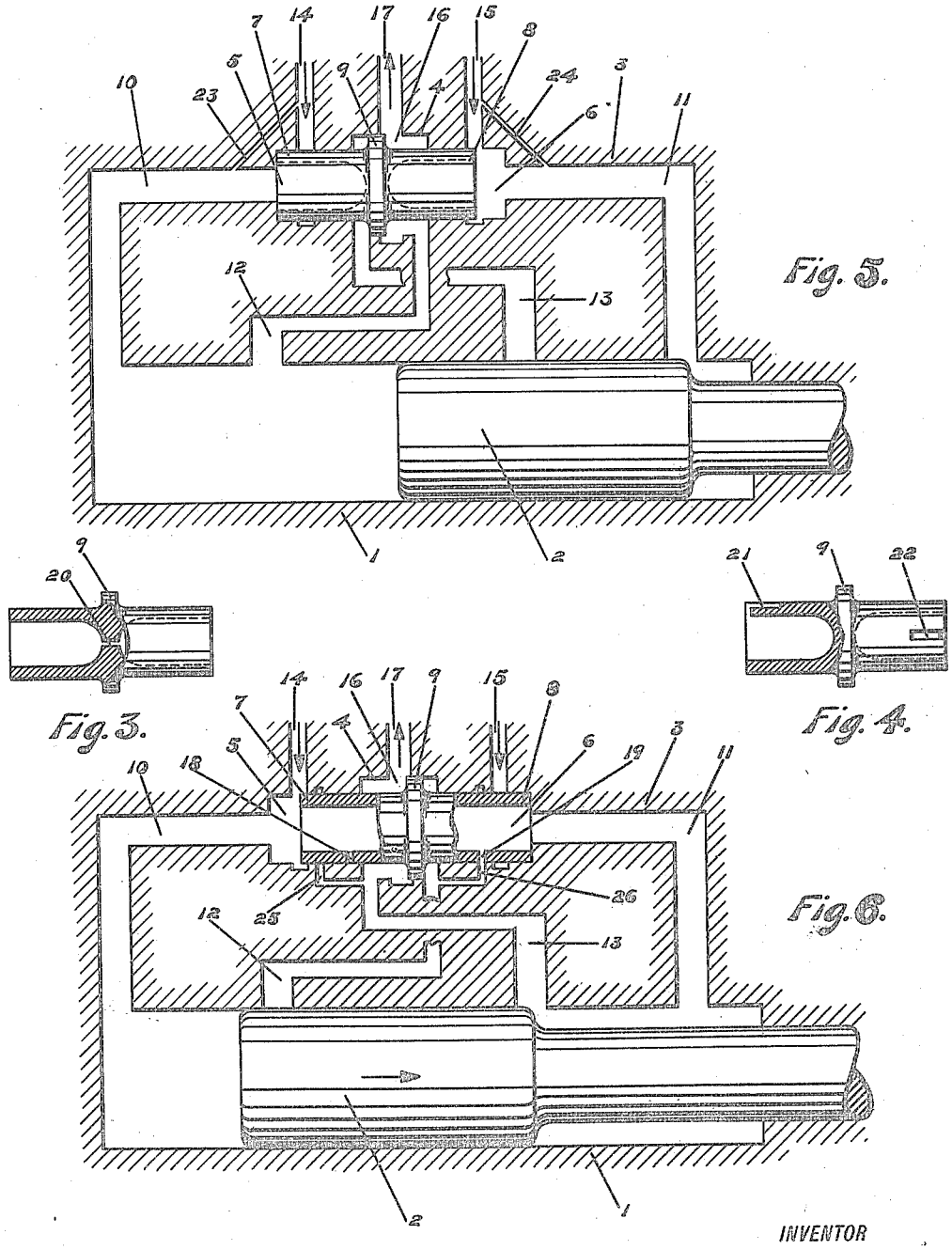

UNITED STATES PATENT OFFICE.

RUSSELL H. WILHELM, OF EASTON, PENNSYLVANIA, ASSIGNOR TO INGERSOLL-RAND COMPANY, OF JERSEY CITY, NEW JERSEY, A CORPORATION OF NEW JERSEY.

VALVE FOR PERCUSSIVE TOOLS.

1,248,966.  Specification of Letters Patent.  Patented Dec. 4, 1917.

Application filed October 20, 1915. Serial No. 56,829.

*To all whom it may concern:*

Be it known that I, RUSSELL H. WILHELM, a citizen of the United States, residing at Easton, in the county of Northampton and State of Pennsylvania, have invented a certain new and useful Improvement in Valves for Percussive Tools, of which the following is a specification.

This invention relates to valves for fluid operated percussive tools, and more particularly to valves for fluid operated rock drills of the type wherein the valve is thrown by compression generated in the ends of the cylinder by the movement of the piston.

One object of this invention is to provide a valve of this type so arranged that the exhaust for each end of the cylinder will be closed simultaneously with or before the opening of the inlet for that end of the cylinder, thus preventing blow off and loss of air.

A further object is to provide a means for causing the immediate and positive throw of the valve when the piston reaches a certain point regardless of the load on the piston or the length of the piston stroke.

With these objects in view a valve has been devised, practical embodiments of which are shown in the accompanying drawings, in which—

Figure 1:
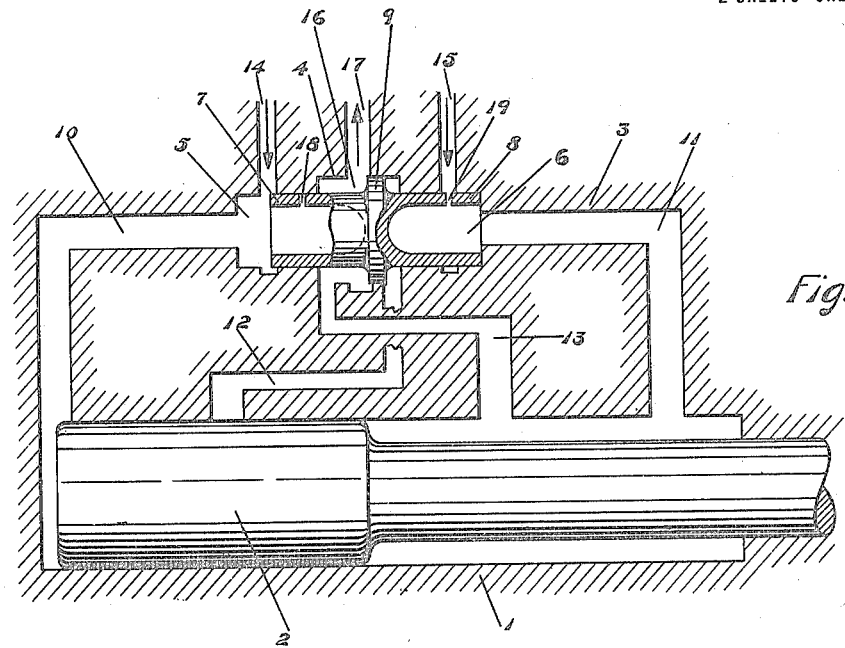
Figure 1 shows a diagrammatical section through a drill provided with one embodiment of the valve.
Figure 2:
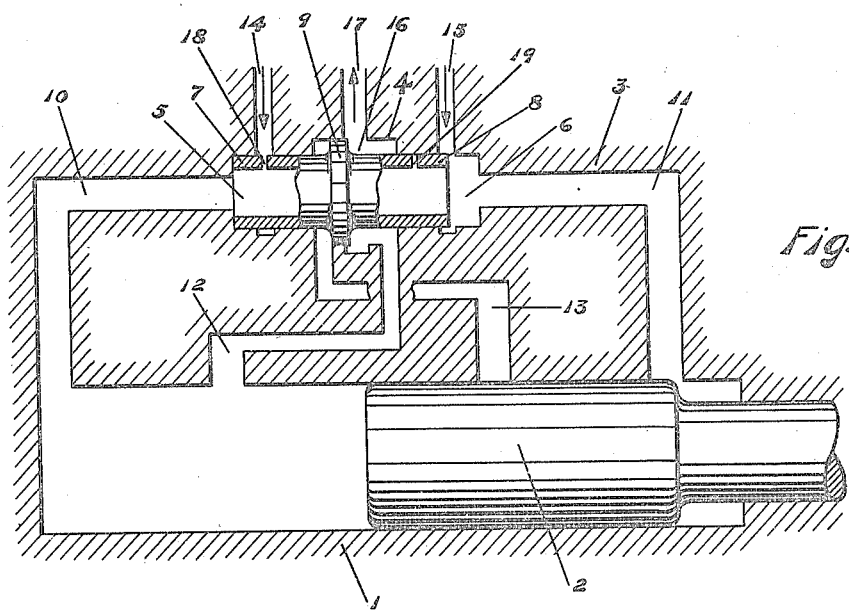
Fig. 2 shows a section through the same drill with the valve and piston in different positions.

Figs. 3 and 4 show modifications of valves capable of use in the drill shown in Figs. 1 and 2; and Figs. 5 and 6 show sections through drills showing further modifications of the invention.

The drill or tool, as shown, comprises a cylinder 1, in which reciprocates a piston 2. Alongside of the cylinder is a valve chest 3 in which is a valve bore, the central portion 4 of which is of larger diameter than the ends 5 and 6. In the valve bore slides the valve which consists of a body portion, the ends 7 and 8 of which fit the ends 5 and 6 of the valve bore, and a flange 9 which fits the larger portion 4 of the valve chest. From the ends 5, 6 of the valve bore, inlet passages 10, 11 lead to the ends of the drill cylinder 1, while to the ends of the larger diameter portion 4 of the valve bore exhaust passages 12 and 13 lead from points in the cylinder spaced at some distance from the ends thereof, the exhaust passage 12 from the rear end of the cylinder leading to the end of the larger valve bore portion 4 opposite to the end 5 of the valve bore from which the inlet passage 10 for the rear end of the cylinder leads, and the inlet and exhaust passages 11 and 13 for the front end of the cylinder similarly leading to opposite ends of the smaller and larger valve bore portions.

Into the sides of the valve bore ends 5 and 6, at some distance from the ends thereof, inlet passages 14 and 15 lead, respectively, from the source of supply, while surrounding the central part of the larger valve bore portion is an exhaust chamber 16 which communicates with the atmosphere by a port 17. The ends of the valve are shown hollowed out for the sake of lightness, and through the sides of the valve are leak ports 18 and 19 which register respectively with passages 14 and 15 when the valve is in a position to close these passages 14 or 15 from communication with the cylinder inlet passages 10 or 11. An important feature of the present invention is the comparative area of the faces of the flange 9 on the valve and the opposite ends of the valve body. The area of each end of the valve body should be approximately equal to the area of the opposite flange face.

In operation, the parts being in the positions shown in Fig. 1, air is being admitted through the inlet passages 14 and 10 to the rearward end of the cylinder 1. This drives the piston 2 forwardly. When the rear end of the piston passes the opening of exhaust passage 12 from the cylinder, air under line pressure will be admitted to the forward end of the larger portion 4 of the valve bore. Since the area of the flange 9 exposed to this pressure is approximately equal to the rear end surface of the valve body 7, the valve will be practically balanced, the area of the valve body end being in practice a few per cent. larger to prevent fluttering. During the first part of the piston stroke forward, the fluid in front of the piston will exhaust through passage 13 and exhaust chamber 16 to atmosphere. When the forward end of the piston passes the passage 13, however, compression will begin to build up in the forward end of the cylinder, and since the valve is nearly balanced when the passage 12 is opened by the rear end of the piston, the pressure generated by the piston through the passage 11 and exerted on the valve body end 8 will throw the valve into the position shown in Fig. 2 very shortly after the piston has passed the opening of passage 13. This will allow fluid under pressure to enter the forward end of the cylinder and move the piston rearward, the valve flange at the same time opening the passage 12 to the exhaust chamber 16. Since the ends of the valve run by the valve chest inlet passages 14 and 15 the exhausts 12 and 13 will not be opened until the inlet passages are closed and vice versa, any blow through of air being thus prevented.

The function of the leak ports 18 and 19 is to enable the valve to throw if the piston should not be able to complete its full stroke and generate enough compression to throw the valve by compression. For example, if the piston in either a piston drill or a hammer drill where the piston effects the rotation of the steel, is retarded so that it does not complete its full stroke forwardly, operating fluid passing through the leak port 19 will thrown the valve a short interval of time after the passage 12 has been uncovered by the rear end of the piston and the pressures on the valve balanced by the admission of live fluid against the front face of flange 9, the valve throwing whether the piston travels forward farther and provides compression or not. The leak ports aid, moveover, in the normal operation of the drill, the valve throwing more quickly after the exhaust ports have been covered by the piston in each direction, thus enabling the exhaust ports to be placed nearer the ends of the cylinder and a freer exhaust obtained.

In Figs. 3 and 4 modifications of the valve showing different embodiments of the arrangement of the leak ports are shown, in Fig. 3 there being only a single port 20 passing through the valve, while in Fig 4 channels 21, 22 on the outside of the valve take the place of the leak ports 18 and 19. In Fig. 5 the leak ports 23 and 24 pass through the walls of the valve chest from the passages 14 and 15 to the passages 10 and 11.

In Fig. 6 is shown a modification in which the very slight loss from the leak ports into the ends of the cylinder when open to exhaust, which occurs in the previously described forms, is eliminated. In this form the supply of air passing through the leak ports to throw the valve comes from the passages 12 and 13, passages 25 and 26 being provided which lead from the passages 12 and 13 to the sides of the valve bore opening into it at points so placed that the leak ports will alternately register when the valve is in one position or the other.

It will be evident that with the parts as shown in Fig. 6 no air can pass through leak port 19 until the rear end of the piston has passed the opening of passage 12 and live fluid has been admitted to this passage, and to the forward end of the larger valve bore portion, and accordingly there is no leak into the forward end of the cylinder while it is open to exhaust, but only a leak at a time just before the valve is thrown and when the exhaust passage 13 is closed.

It is to be understood that while the present showing and description discloses only certain specified modifications of this invention, other forms and modifications are included within the spirit and scope of the invention as expressed in the appended claims.

What I claim is:

1. In a fluid operated percussive tool, a cylinder, its piston, a valve chest having a valve bore with a central portion of larger diameter than the ends thereof, a valve in said bore having a body fitting the ends of said bore, and a central flange fitting the central portion of said bore, cylinder inlet passages leading to the ends of said cylinder from the ends of said valve bore, valve chest inlet passages leading to the sides of said bore near the ends thereof, exhaust passages leading from the sides of said cylinder at points spaced from the ends thereof, to the ends of the larger portion of said valve bore, a valve chest exhaust passage leading to atmosphere from the central portion of said larger valve bore and intermittently operated leak ports for conveying live fluid from the inlet passages of the tool to exert pressure on the ends of the valve.

2. In a fluid operated percussive tool, a cylinder, its piston, a valve chest having a valve bore with a central portion of larger diameter than the ends thereof, a valve in said bore having a body fitting the ends of said bore, and a central flange fitting the central portion of said bore, cylinder inlet passages leading to the ends of said cylinder from the ends of said valve bore, valve chest inlet passages leading to the sides of said bore near the ends thereof, exhaust passages leading from the sides of said cylinder at points spaced from the ends thereof to the ends of the larger portion of said valve bore, a valve chest exhaust passage leading to atmosphere from the central portion of said larger valve bore, passages leading from the exhaust passages to the sides of the smaller valve bore portions, and leak ports in the end portions of the valve adapted to register alternately with said passages when the valve is at the end of its stroke in either direction.

3. In a percussive tool, a cylinder, a valve chest having a bore and a chamber therearound, a valve having a body fitting said bore and reciprocating therein and a flange reciprocating in said chamber, exhaust passages from the cylinder controlled by said flange, inlet passages controlled by the ends of said valve body and means for intermittently conveying a small amount of live fluid from the inlet of the tool to exert pressure on the ends of the valve.

4. In a percussive tool, a cylinder, a valve chest having a bore and a chamber therearound, a valve having a body fitting said bore and reciprocating therein and a flange reciprocating in said chamber, exhaust passages from the cylinder controlled by said flange, inlet passages controlled by the ends of said valve body and leak ports for conveying live fluid from the inlet passages of the tool to exert pressure intermittently on the ends of the valve.

In testimony whereof, I have hereunto set my hand.

RUSSELL H. WILHELM.

Witnesses:
JAS. A. SULLIVAN,
LENNON O'BRIEN.